J. R. GIBSON.
FRUIT EATING SHIELD.
APPLICATION FILED MAY 20, 1919.

1,324,659.

Patented Dec. 9, 1919.

Inventor,
Joseph R. Gibson
By C. F. Belt
Atty.

UNITED STATES PATENT OFFICE.

JOSEPH ROBERT GIBSON, OF CHICAGO, ILLINOIS.

FRUIT-EATING SHIELD.

1,324,659.  Specification of Letters Patent.  Patented Dec. 9, 1919.

Application filed May 20, 1919. Serial No. 298,468.

*To all whom it may concern:*

Be it known that I, JOSEPH ROBERT GIBSON, a citizen of the United States, residing at Chicago, in the county of Cook and State of Illinois, have invented certain new and useful Improvements in Fruit-Eating Shields, of which the following is a specification.

This invention relates to articles for dining table use, and pertains especially to a guard or shield adapted to be applied to fruit, such as grapefruit, oranges, and the like, during the process of eating the same.

The object of the invention is to provide a shield adapted to fit over and engage the cut surface of such fruit as oranges and grapefruit for preventing escape of the fruit juice, and to permit the pulp of such fruit to be lifted from the fruit skin or shell without removing the shield.

A further object of the invention is a guard or shield for preventing the escape of fruit juices during the consumption of the fruit pulp, and embodying means for holding the shield free upon the fruit so that either the fruit or the shield may be revolved, and so as to permit removal of the pulp during such revolution without removing the shield.

In the accompanying drawings forming part of this application:—

The same reference characters denote the same parts throughout the several views of the drawings.

Figure 1:
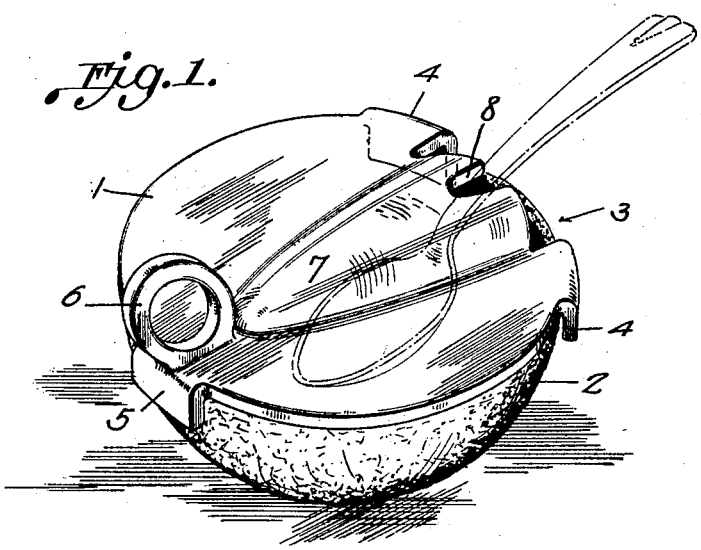
Figure 1 is a perspective view showing the application of the invention to half of a grapefruit.
Figure 2:
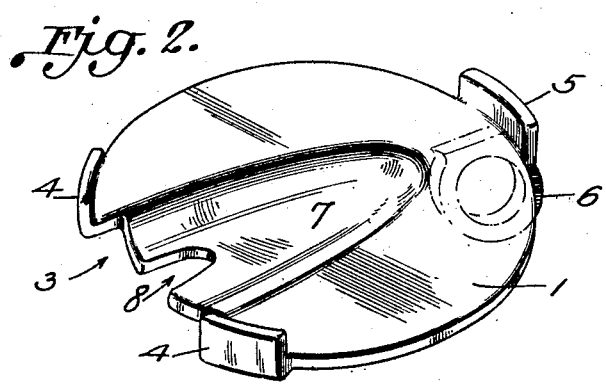
Fig. 2 is an inverted perspective view of the shield.

It is well known that in eating such fruit as oranges and grapefruit, the manipulation of a spoon therein causes the juice to be ejected and sprayed to great disadvantage, inconvenience and waste, therefore I have devised a shield to permit a spoon to be worked as usual in the fruit, and to prevent such escape and spraying of the juice, and which will permit a spoon to be inserted and withdrawn by merely tilting the shield.

In carrying out my invention, I preferably have the shield composed of transparent material such as glass, which may be molded or otherwise formed into a plate disk 1, of sufficient thickness as to withstand hand pressure when applied to a cut or half grapefruit as 2, and such pressure is distributed over the flat cut portion so as to hold the fruit in eatable position. The disk 1 has a cut out or opening 3 in its periphery of such size as to permit the manipulation of a spoon handle for working the pulp into a spoon preparatory to tilting the shield for removing the spoon with the pulp.

The periphery of the disk is provided with a pair of depending flanges 4, one at each side of the opening 3, and a similar flange 5 depends from the periphery of the disk opposite said pair of flanges. These flanges afford means for grasping the anterior of the fruit so as to permit either the fruit or the shield to be turned or revolved during fruit eating.

The disk is provided with a finger ring 6 adjacent to and overhanging the flange 5, so that in tilting the shield the intersection of the flange 5 and the disk forms a pivot bearing. The ring is also of importance in that a hand finger is inserted therethrough in grasping the fruit with the same hand, whereby the disk may be pressed upon the fruit so as to close and hold the fruit in eatable position.

In order to provide for expeditiously working a spoon in the fruit and removal of the latter without tilting the shield, the disk has a convexed concaved hood 7 elevated above the disk and extending from the cut out 3 to a contracted end adjacent the rear flange and handle so as to form a pocket under which a spoon is manipulated. This hood tapers from its front to its rear end which is flush with the face of the disk. The front end of the hood 7 has a notch 8 for a spoon handle.

Figure 3:
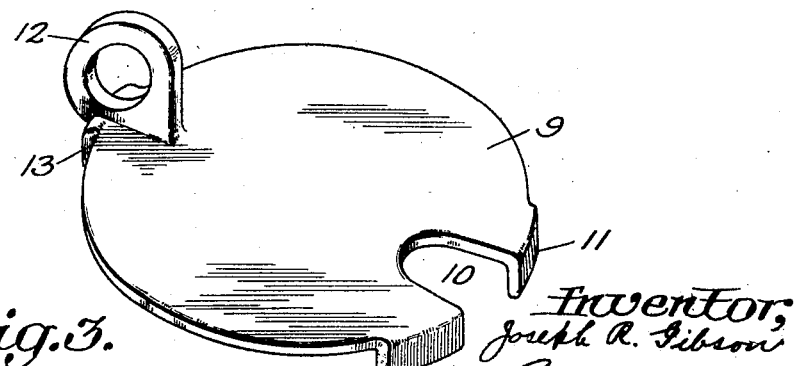
Fig. 3 is a perspective view showing a modification.

Referring to the modification shown in Fig. 3 of the drawings, the disk 9 is flat throughout and has a spoon handle notch 10 adjacent a pair of rim flanges 11, and the handle 12 is formed on a rear flange 13.

Obviously in placing the disk upon a cut face or half portion of such as a grapefruit, the flanges prevent the shield from slipping off, and sufficient hand pressure may be made on the shield to hold it and the fruit in temporary position to use a spoon under the hood which permits the pulp and juice to be lifted out without displacing the shield, but the shield may be tilted sufficiently to permit the spoon containing pulp or juice to be withdrawn. During such operation either the shield or the fruit may be turned or revolved to permit repeating such operations without removing the shield, and during such operations the eatable or pulp portion of the fruit is visible by reason of the transparency of the shield.

It will be understood that the size of the shield may be varied, one size being applicable to fruit having slight variations in size or diameter, by reason of the spaced flanges, and that one or more of the other sizes of the shield may be provided for smaller and larger fruit. The shield may also be used on or in connection with food dispensing articles where its functions and purposes are applicable.

While I have shown and described the shield as composed of glass, it may be made of any suitable material of sufficient stiffness and strength as to permit similar functions and operations. Therefore I do not wish to be understood as confining the invention to any particular material, size and shape, nor to the number and location of the rim flanges, neither do I wish to limit myself in the particular form and location of the hood and finger engaging element, but reserve the right to make such changes and variations in the production and practical application of the invention as may not be inconsistent with the appended claims.

Having thus described my invention what I claim as new and desire to secure by Letters Patent is:

1. As a new article of manufacture, a grapefruit shield comprising a plate adapted to cover a cut portion of such fruit, and a hood forming an elevated pocket on the plate and adapted to permit insertion and extraction of a spoon without displacing the shield.

2. As a new article of manufacture, a shield for the purpose described, comprising a disk having a peripheral cut out, a flange depending from the periphery at each side of the cut out, a flange depending from the periphery opposite the cut out, and a finger-engaging ring projecting from the disk adjacent to the last mentioned flange.

In witness whereof I hereunto set my hand in the presence of two witnesses.

JOSEPH ROBT. GIBSON.

Witnesses:
L. P. ANDREWS,
H. G. HOOVER.